(12) United States Patent
Hegel et al.

(10) Patent No.: US 8,157,972 B2
(45) Date of Patent: Apr. 17, 2012

(54) APPARATUS AND METHOD FOR IMPROVED ELECTROLYTIC WATER TREATMENT PROCESS

(75) Inventors: Rudolph R. Hegel, Richfield, MN (US); Karl J. Fritze, Hastings, MN (US)

(73) Assignee: Oxygenator Water Technologies, Inc., St. Louis Park, MN (US)

( * ) Notice: Subject to any disclaimer, the term of this patent is extended or adjusted under 35 U.S.C. 154(b) by 625 days.

(21) Appl. No.: 12/364,081

(22) Filed: Feb. 2, 2009

(65) Prior Publication Data

US 2009/0211919 A1   Aug. 27, 2009

Related U.S. Application Data

(60) Provisional application No. 61/025,034, filed on Jan. 31, 2008.

(51) Int. Cl.
*C25B 9/00* (2006.01)
*C25B 1/06* (2006.01)
*C02F 9/06* (2006.01)
*C02F 1/42* (2006.01)
*C02F 1/461* (2006.01)

(52) U.S. Cl. ... 204/235; 204/233; 204/234; 210/748.17; 210/190; 210/263; 205/633

(58) Field of Classification Search .................. None
See application file for complete search history.

(56) References Cited

U.S. PATENT DOCUMENTS

| | | |
|---|---|---|
| 1,677,153 A | 7/1928 | Spencer |
| 3,671,022 A | 6/1972 | Laird et al. |
| 3,975,269 A | 8/1976 | Ramirez |
| 4,012,319 A | 3/1977 | Ramirez |
| 4,071,447 A | 1/1978 | Ramirez |
| 4,225,401 A | 9/1980 | Divisek et al. |
| 4,252,856 A | 2/1981 | Sara |
| 4,257,352 A | 3/1981 | Habegger |
| 4,587,001 A | 5/1986 | Cairns et al. |
| 4,732,661 A | 3/1988 | Wright |
| 4,908,109 A | 3/1990 | Wright |
| 5,015,354 A | 5/1991 | Nishiki et al. |
| 5,049,252 A | 9/1991 | Murrell |
| 5,148,772 A | 9/1992 | Kirschbaum |

(Continued)

FOREIGN PATENT DOCUMENTS

EP     0 412 472 A1    2/1991

(Continued)

OTHER PUBLICATIONS

Mohyuddin Mirza et al., "Effect of Oxygenated Water on the Growth and Biomass Development of Seedless Cucumbers and Tomato Seedlings under Greenhouse Conditions," Seair Diffusion Systems, 2003, 8 pages.

*Primary Examiner* — Harry D Wilkins, III

(74) *Attorney, Agent, or Firm* — Patterson Thuente Christensen Pedersen, P.A.

(57) ABSTRACT

An electrolytic water treatment system improving upon the electrode life of electrolytic oxygen generators by reducing mineral precipitation and fouling that typically occurs in water treatment systems. The electrolytic water treatment system can include a softened water bypass stream into which a flow-through electrolytic element can be positioned. By eliminating exposure of the electrolytic element to hard water, scale formation on electrodes can be significantly reduced such that polarity reversal cycles of the electrolytic element decrease in frequency.

10 Claims, 15 Drawing Sheets

U.S. PATENT DOCUMENTS

| | | |
|---|---|---|
| 5,182,014 A | 1/1993 | Goodman |
| 5,534,143 A | 7/1996 | Portier et al. |
| 5,552,052 A | 9/1996 | Mazewski et al. |
| 5,561,944 A | 10/1996 | Ismail et al. |
| 5,622,610 A | 4/1997 | Nakamura |
| 5,697,187 A | 12/1997 | Persinger |
| 5,728,287 A | 3/1998 | Hough et al. |
| 5,766,479 A | 6/1998 | Collentro et al. |
| 5,807,473 A | 9/1998 | Sadler et al. |
| 5,858,199 A | 1/1999 | Hanak |
| 5,887,383 A | 3/1999 | Soeda |
| 5,982,609 A | 11/1999 | Evans |
| 6,171,469 B1 | 1/2001 | Hough et al. |
| 6,173,526 B1 | 1/2001 | Mazzei |
| 6,284,293 B1 | 9/2001 | Crandall et al. |
| 6,299,145 B1 | 10/2001 | Ganan-Calvo |
| 6,315,886 B1 | 11/2001 | Zappi et al. |
| 6,328,875 B1 | 12/2001 | Zappi et al. |
| 6,386,751 B1 | 5/2002 | Wootan et al. |
| 6,394,429 B2 | 5/2002 | Ganan-Calvo |
| 6,471,873 B1 | 10/2002 | Greenberg et al. |
| 6,491,815 B2 | 12/2002 | Zulik et al. |
| 6,508,033 B2 | 1/2003 | Hessel et al. |
| 6,524,475 B1 | 2/2003 | Herrington et al. |
| 6,634,138 B2 | 10/2003 | Katzman |
| 6,689,262 B2 | 2/2004 | Senkiw |
| 6,890,126 B2 | 5/2005 | Mazzei |
| 7,045,102 B2 | 5/2006 | Fraser et al. |
| 7,128,278 B2 | 10/2006 | Archambeau et al. |
| 7,396,441 B2 | 7/2008 | Senkiw |
| 2001/0027943 A1 | 10/2001 | Conrad et al. |
| 2002/0074237 A1 | 6/2002 | Takesako et al. |
| 2002/0168418 A1 | 11/2002 | Lorenz, II et al. |
| 2004/0118786 A1 | 6/2004 | Fraser et al. |
| 2006/0150491 A1 | 7/2006 | Senkiw |
| 2008/0179259 A1 | 7/2008 | Senkiw |
| 2008/0202995 A1 | 8/2008 | Senkiw |
| 2008/0237060 A1 | 10/2008 | Hegel et al. |

FOREIGN PATENT DOCUMENTS

| | | |
|---|---|---|
| EP | 0 723 936 A2 | 7/1996 |
| GB | 1 522 188 | 8/1978 |
| JP | 63309118 | 12/1988 |
| JP | 2004-249174 A | 9/2004 |
| KR | 2000-0060834 | 10/2000 |
| WO | WO 95/21795 | 8/1995 |
| WO | WO 99/39561 | 8/1999 |
| WO | WO 01/89997 A2 | 11/2001 |
| WO | WO 03/072507 A1 | 9/2003 |

APPARATUS AND METHOD FOR IMPROVED ELECTROLYTIC WATER TREATMENT PROCESS

PRIORITY CLAIM

The present application claims priority to U.S. Provisional Application Ser. No. 61/025,034 filed Jan. 31, 2008, and entitled "APPARATUS AND METHOD FOR IMPROVED ELECTROLYTIC WATER TREATMENT PROCESS", which is herein incorporated by reference in its entirety.

FIELD OF THE INVENTION

This invention relates generally to water treatment using an electrolytic chamber to generate oxygen for the oxidation, conversion, and precipitation of contaminants so as to facilitate subsequent removal of the contaminants by filtration. More specifically, the present invention is directed to a treatment apparatus and related methods for maximizing the useful life of the electrodes and minimizing build-up of precipitates and contaminants during generation of oxygen for water sources having varying levels of contaminants.

BACKGROUND OF THE INVENTION

Water systems which obtain their water by pumping from underground water tables using wells can have numerous water quality problems. It is typical to find that ground water has high amounts of dissolved minerals which come from the rocks within the aquifers. Further is it quite common to find nuisance and even toxic metals dissolved into the water. Treating this ground water so that the resulting water is appealing or safe to use can be a challenging pursuit.

Most of the minerals and metals that are dissolved in ground water are ionic, that is, the molecules are disassociated atoms in solution. These ions are quite small, ranging from 3-20 angstrom units or 0.0003 to 0.0020 microns in size. Filtration of ions with conventional filtering technologies is almost impossible, leaving only the more expensive treatment options such as reverse osmosis, deionization or distillation. It is easy to see the minerals which are dissolved in water as they leave white or colored powders and deposits when the water is evaporated. If the deposit is easily dissolved by adding fresh water, the deposit is soft. If the deposit does not readily dissolve in water again—it is considered hard. Water with hard minerals dissolved into it is problematic to water systems, particularly with water heating systems, as hard water tends to build up scale and thick deposits of these precipitated insoluble minerals and damage or occlude the piping, heat exchangers, or tanks etc. Soft waters do not experience this kind of problem.

To treat minerals, it is quite common to exchange one type of mineral for another by using an electrostatic resin. For example, a typical water softener can exchange calcium and magnesium carbonates (hardness) for sodium chloride (softness). In this process, the water softener has a large bed of resin beads composed of quaternary ammonium cations. Each bead has an electrostatic charge such that the bead can be coated to hold an amount of common salts, with sodium chloride being among the most common. This anionic ion-exchange resin has an affinity to certain minerals and prefers "hard" minerals more than the "soft" minerals. In use, water containing hard minerals passes by these resin beads and the hard minerals stick to the resin while the soft minerals are displaced from the resin. The process continues until there are no remaining soft minerals on the beads. When the beads are saturated with hard minerals, even these hard minerals begin to escape such that "hard" water beings exiting the water softener. The process is reversed by flooding the spent resin with a saturated solution of soft minerals until all of the hard minerals are removed in a process called brining. After a water rinse, the resin bed is ready to exchange soft for hard minerals again. Water softening does not remove minerals but instead exchanges problematic hard minerals for soft minerals.

Dissolved metals pose a similar problem. These metals are normally dissolved into the ground water in the absence of oxygen so they are transparent. Iron is a common metal contaminant and is usually found as clear-water iron or ferrous iron. Iron in the ferrous or non-oxidized form is not able to be filtered with conventional filtering technologies and again requires the more expensive methods for removal such as, for example, reverse osmosis, deionization or distillation. Iron can also be removed from water using a chemically based removal system, such as potassium permanganate and greens and filtration systems. However, if ferrous iron is exposed to oxygen, the resulting oxidized iron precipitates into a larger, suspended molecule, which can then be filtered using conventional filtration techniques including a large variety of common media filters using sand or other mineral particulates being the most common. While iron and manganese tend to be among the most common dissolved metals, arsenic, chromium, and other highly toxic metals are also able to be filtered with conventional filtering technologies when oxidized.

Most systems that are in use today to remove iron and manganese use air as the source of oxygen. Air contains about 78% nitrogen and 21% oxygen—with the balance comprising carbon dioxide and other trace gases. Air is introduced into the contaminated water using a variety of methods and given enough time, the dissolved metals will oxidize and there precipitate for removal using conventional filtration techniques.

Most commercial iron removal systems require long retention times to adequately oxidize iron and manganese, and are not normally able to treat some of the other more toxic metals. Further, the added minerals in these waters are also precipitated and foul the piping, tanks, valves—which reduces the life of all of the components. In addition, water containing dissolved iron is often plagued by iron-eating bacteria. This type of biological contaminant is not normally toxic, but can cause significant problems in water and water treatment equipment by forming thick impervious biofilms. Evidence of the presence of iron-eating bacteria can include orange and blood-stained clothing, toilets, showers, as well as a foul odor.

There have been recent advances in the technology of aqueous metallic oxidation by using electrolysis. U.S. Pat. No. 6,689,262 discloses a method to produce pure microbubbles of oxygen in water, and U.S. Patent Applications 2006/0150491 and 2004/0118701 teach methods of utilizing this technology to treat water in flow-through devices. In general, these techniques use electricity and titanium electrodes to convert water into microbubbles of pure oxygen so as to cause dissolved aqueous metallic contaminants to be oxidized for subsequent removal with suitable barrier filtration technologies. These micro bubbles of oxygen rapidly and effectively convert dissolved metals into metallic oxides suitable for conventional filtering. Flow-through chambers are constructed to house various arrays of anodes and cathodes and allow the efficient generation of micro bubbles of pure oxygen. These very small bubbles rapidly dissolve into water at a very high rate and can often super-saturate water. These devices are so effective at oxidizing water electrolytically that they will precipitate metals and minerals to an excess.

Unfortunately, electrolytic water treatment systems are subject to fouling and operational disruptions caused by the formation and deposit of precipitated minerals and metallic oxides on the electrodes. These precipitates build rapidly on electrodes and surrounding surfaces until they become occluded and rendered electrically impotent. In response, prior systems have included methods for alternating the polarity of these electrodes periodically such that a partial reversal of the scaling process can take place. Any electrode acting as an anode will evolve hydrogen-based acidic water (H+) near the electrode surface as it releases oxygen bubbles. This acidic water film can help to remove surface deposits which were precipitated during the previous cathodic operation interval. At the opposing electrode, or cathode, water is converted into a basic or alkaline species with an excess of hydroxide molecules (OH−). In this environment, hydrogen is evolved while scale is precipitated on the anode's metal surface. The reversal of the electrical polarity will help forestall the eventual degradation of the electrodes but as they are used, they will decay to a point which renders them ineffective. By treating the titanium electrode with a catalytic coating such as iridium, platinum, rhodium, and ruthenium, various anodic and cathodic reactions can be optimized to produce cleaner longer-lasting electrodes and yield of preferred evolved gases.

Given the state-of-the-art in electrode technology materials, using the optimum polarity reversal timing schemes, and even employing intelligent current and voltage control, these electrolytic chambers have a relatively short life—even thought they are very efficient at precipitating metallic and mineral contaminants. As such, it would be advantageous to improve on current electrolytic treatment systems so as to increase their effective life.

SUMMARY OF THE INVENTION

The electrolytic water treatment process disclosed herein, addresses three of the shortcomings identified with electrolytic water treatment systems; (1) short electrode life; (2) mineral precipitation and fouling; and (3) control of biofilms and organic fouling.

If an electrolytic flow-through chamber is employed in clean, softened water, water without hard minerals or metallic contaminants, the life of the electrodes will last a considerable time. It is the purpose of this invention to place the electrolytic flow-through chamber in this type of clean, softened water while still providing superior aqueous metallic oxidation.

The above summary of the invention is not intended to describe each illustrated embodiment or every implementation of the present invention. The figures and the detailed description that follow more particularly exemplify these embodiments.

BRIEF DESCRIPTION OF THE FIGURES

These as well as other objects and advantages of this invention, will be more completely understood and appreciated by referring to the following more detailed description of the presently preferred exemplary embodiments of the invention in conjunction with the accompanying drawings of which.

DETAILED DESCRIPTION OF THE FIGURES

Figure 1:
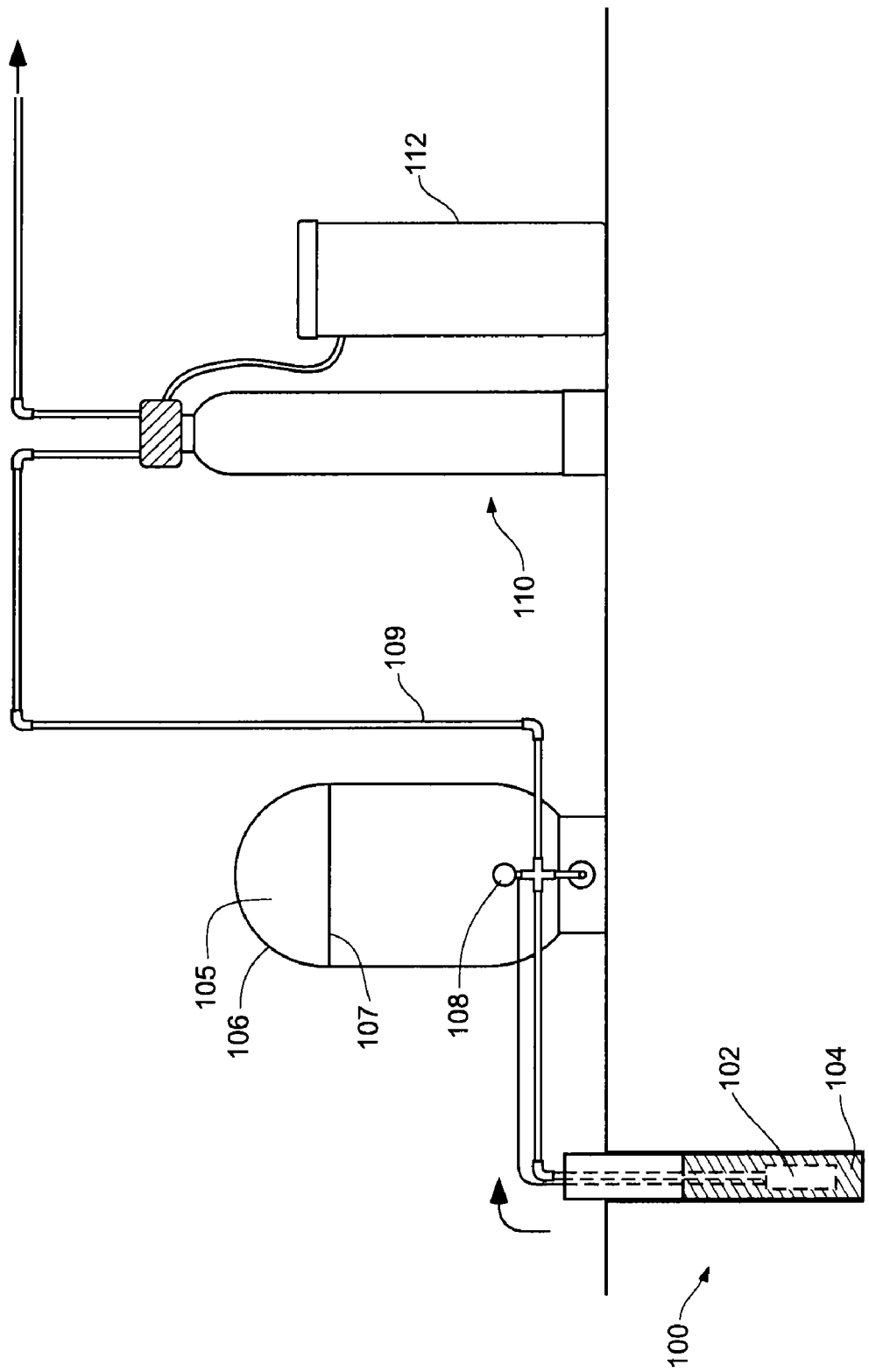
FIG. 1 is a schematic flow diagram of an embodiment of a conventional well water system of the prior art.

Various configurations of conventional well water treatment systems of the prior art are illustrated generally in FIGS. 1-4. The most basic embodiment of a residential well water system is illustrated within FIG. 1. In FIG. 1, a well 100 is utilized to access an aquifer. A well pump 102 pumps well water 104 from well 100 into a pressure tank 106. Typically, pressure tank 106 includes a diaphragm 107 which stores water while compressed air 105 in the pressure tank 106 provides near-constant pressure during draw-down of the pressure tank 106. Pressure tank 106 typically includes a pressure switch 108 for selectively operating well pump 102. The well pump 102 turns on when the pressure switch 108 is at a low pressure and turns off when the pressure switch 108 reaches a higher set pressure. When well water 104 is drawn from the pressure tank 106 such as, for example, from a faucet in a house, the pressure tank 106 forces water through a distribution pipe 109 until the pressure tank 106 is drawn down to a low pressure, which subsequently turns on the well pump 102 to recharge the pressure tank 106. The cycle is continually repeated as water is utilized.

It is common for well water 104 to be categorized as "hard" water necessitating the use of an ion-exchange water softener 110. In cases where the well water 104 includes a low amount of dissolved iron (generally less than 3 ppm), water softener 110 can be used to remove the iron with the consequence that the ion exchange resin in the water softener 110 becomes iron-fouled. In some cases where iron is removed with water softener 110, it is often necessary to use chemicals such as sodium bisulfite mixed into a brine tank 112 to cleanse the resin of iron deposits during the water softener's 10 recharging cycle.

Figure 2:
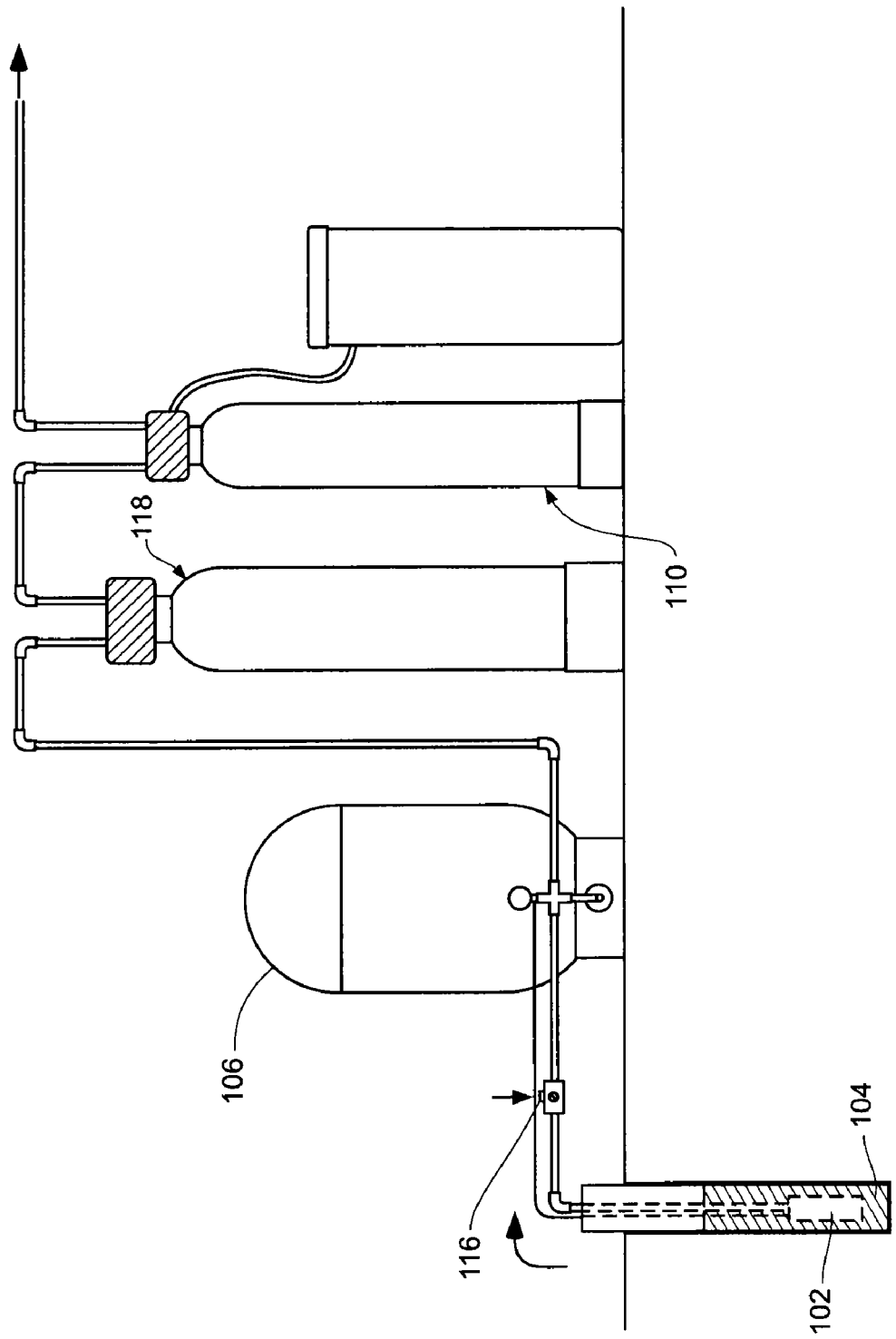
FIG. 2 is a schematic flow diagram of an embodiment of a conventional well water system of the prior art using venture air injection for iron removal.

As illustrated in FIG. 2, another well-water system specifically addresses iron removal from well water 104. An air injection system oxidizes dissolved metals including iron using the oxygen found in air. The air injection system a special venturi injector 116 which draws ambient air into the well water 104 as the well pump 102 is running. The pressure drop across the nozzle inside the venturi injector 116 will produce a low enough pressure to pull in sufficient quantities of air such that much of the dissolved metals and iron can be oxidized. It is necessary that the air be exposed to the dissolved metals and iron for at least a minimum dwell or exposure time such that the oxygen has sufficient time to dissolve into the water and oxidize the dissolved metals. The dwell or exposure time is often equal to or greater than 60 seconds. For this reason, the air must be injected before the pressure tank 106 so that there is enough contact time between pump cycles to let the water soak in the injected air. All of the oxidized and thereby precipitated iron can then be removed using a conventional sand filter 118. The sand filter 118 requires periodic back-flushing to expand the filter bed and to ensure that the filtered contaminants are flushed away and do not plug the sand filter 118. The chief benefits of this system are its simplicity without controls and electricity and chemical-free operation.

The disadvantages of the system illustrated in FIG. 2 are that the pressure tank 106 and surrounding plumbing can become fouled with iron and scale. These components may need to be serviced or replaced every few years to keep them from plugging and/or failing. Also, the venturi injector 116 represents a flow restriction in the plumbing system and reduces maximum flow rates. Excess air entrained in the water can make the water bubble and spurt at the taps and filtered water may have a milky appearance until the dissolved air escapes. Ice makers using this type of system often have white ice cubes. Venturi injector 116 also will not work with well-water systems that have the newer constant-pressure well pumps. These constant-pressure well pumps are triggered to operate at small pressure drops and also can be variable speed to keep the system pressure and flow rates nearly constant. Venturi injector 116 generally needs a consistent pressure drop to operate correctly. Additionally, systems with moderate to high amounts of iron are frequently plagued with iron bacteria that can aggravate scaling and lead to biofilm plugging of many of the pipes and components. Shocking wells and water systems with high concentrations of sodium hypochlorite (chlorine) is a common method of preventative maintenance. Most municipal water treatment plants use chlorine to disinfect its water with a residual concentration of 2 ppm. Well shocking may require at least 100 ppm for many hours to control the iron, scale, and biofilm accumulation.

Figure 3:
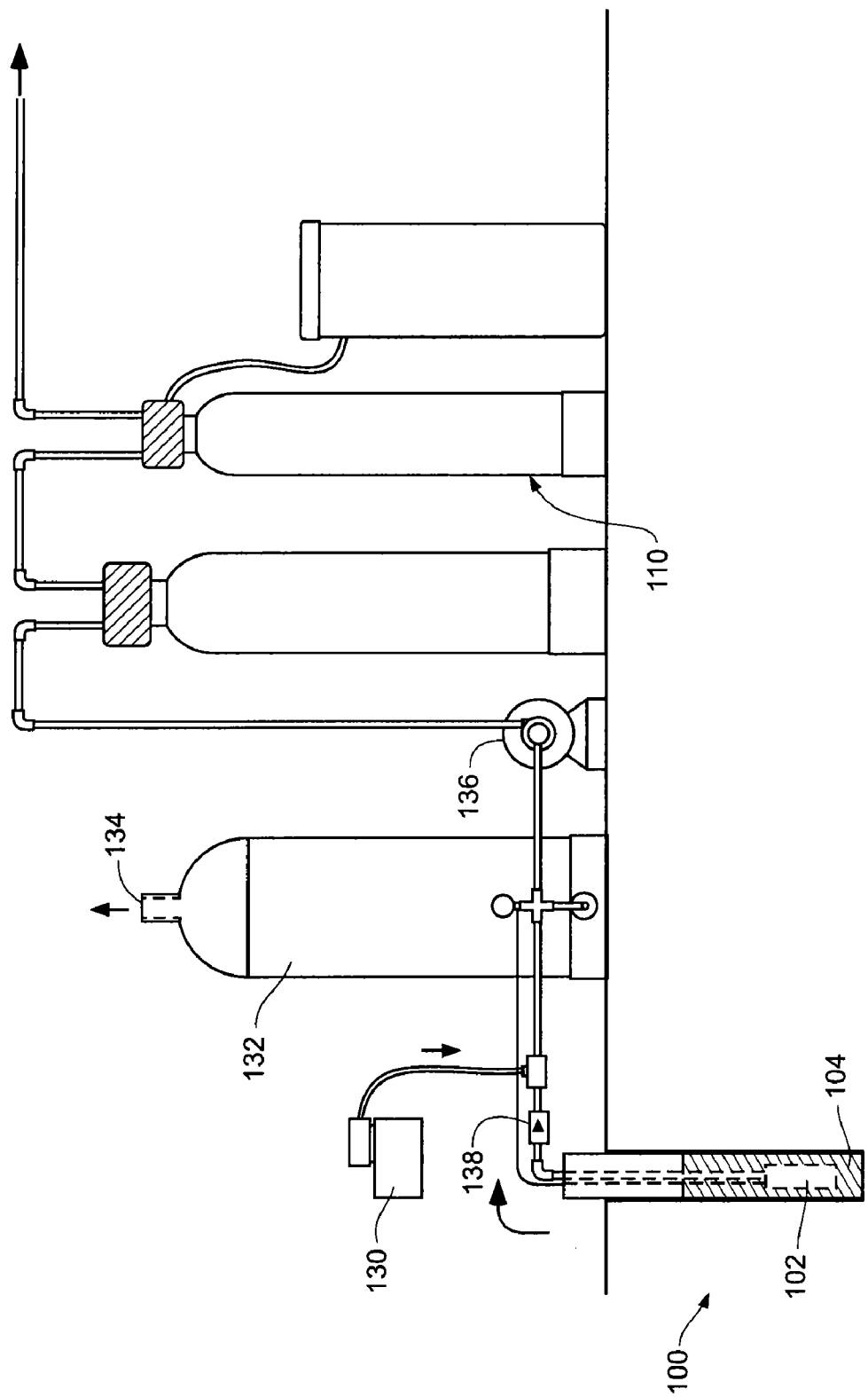
FIG. 3 is a schematic flow diagram of an embodiment of a conventional well water system of the prior art using air pump injection for iron removal.

FIG. 3 shows another well-water system with a more complex iron removal system. In this version, an air pump 130 forces surrounding air at a pressure greater than the water pressure into a tank 132. This air sparges the well water 104 and allows the oxidation to take place inside the tank 132. Often times the tank 132 will have a vent 134 to the atmosphere to allow much of the excess air to bubble out of solution. Another advantage of this type of venting tank 132 is that other gaseous contaminants such as radium can be vented safely outside. If the tank 132 is vented, a boost pump 136 is required to generate and maintain adequate operating pressure in the system. The iron is filtered out of the well water 104 in the same way as in FIG. 2. Tank 132 can also be constructed to provide a back flushing function to drain out the precipitated rust and scale which accumulates and settles to the bottom of the tank. It is often desirable to install a check valve 138 to prevent aerated water from being drawn backwards into the well 100 and pump 102 system as the dissolved oxygen can damage pump 102 components. Even though this represents a good iron removal system, it still requires long contact times, and can not completely oxidize high levels of aqueous metals such as iron.

Figure 4:
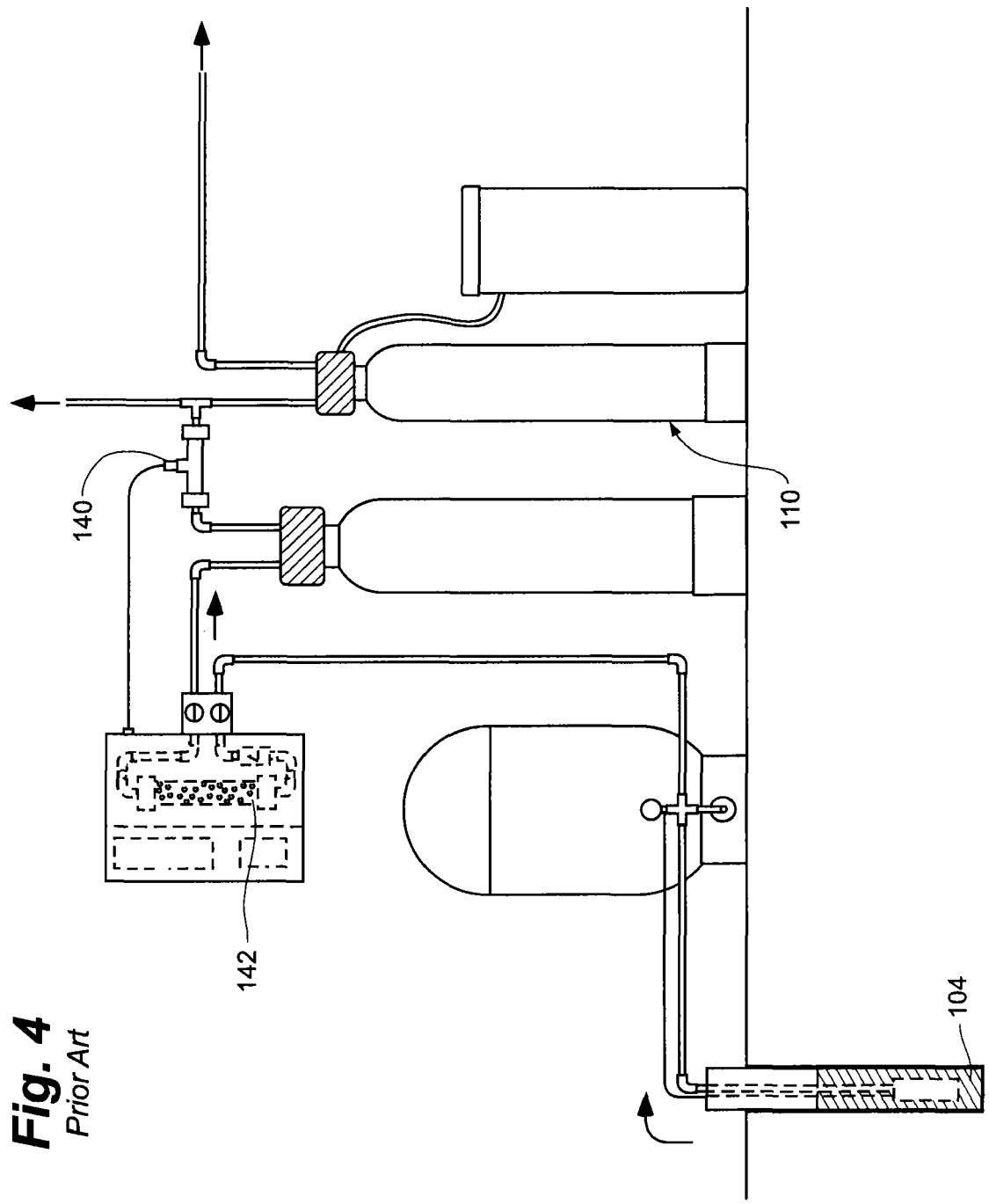
FIG. 4 is a schematic flow diagram of an embodiment of a typical well water system according to the present invention using flow-through electrolysis for iron removal.

FIG. 4 shows yet another iron removal system that utilizes micro-bubbles of high purity oxygen. This oxygen is generated from the well water 104 using electrolysis. A system of this type is described in the previously referenced patent applications. When electrodes made of corrosion resistant metals, such as titanium, are immersed in water with an applied voltage between them the reaction at the electrodes causes water to separate into oxygen and hydrogen. Specialized geometries and catalytic coatings will produce very small bubbles 142 of oxygen and hydrogen. In this case, the hydrogen simply escapes from the water as soon as it has reached atmosphere. The oxygen produced rapidly dissolves into the water, often times beyond saturation. This oxygen-saturated water is able to oxidize large amounts of aqueous metals including iron and manganese. Various arrangements of electrodes are possible with flat parallel plates being the most common. A sensor 140 is used to determine if water is flowing through the system so that the electrodes can be energized. There are many types of sensor technologies available which include differential pressure, differential temperature, vortex shedding, axial and radial impellors, movable flaps, pistons, balls, and other electromagnetic devices. Many of these sensor devices are subject to variation when scale, biofilms, oxides, and other mineral deposits form on them. It is therefore desirable that any device which needed to last a long time without degradation be placed after oxidation, filtration and in some cases, even softening processes are completed.

Referring generally to FIGS. 5-12, various iron removal systems of the present invention utilize the process of electrolysis in a variety of configurations to oxidize contaminants including aqueous metals to provide for physical removal while at the same promoting an increased useful life for an electrolytic element. In a variety of differing configurations, the present invention essentially eliminates exposure of the electrolytic element to bulk amounts of dissolved minerals that can lead to scale formation on the electrolytic element which would otherwise require a polarity reversal and subsequent reduction in the useful life of the electrolytic element.

Figure 5:
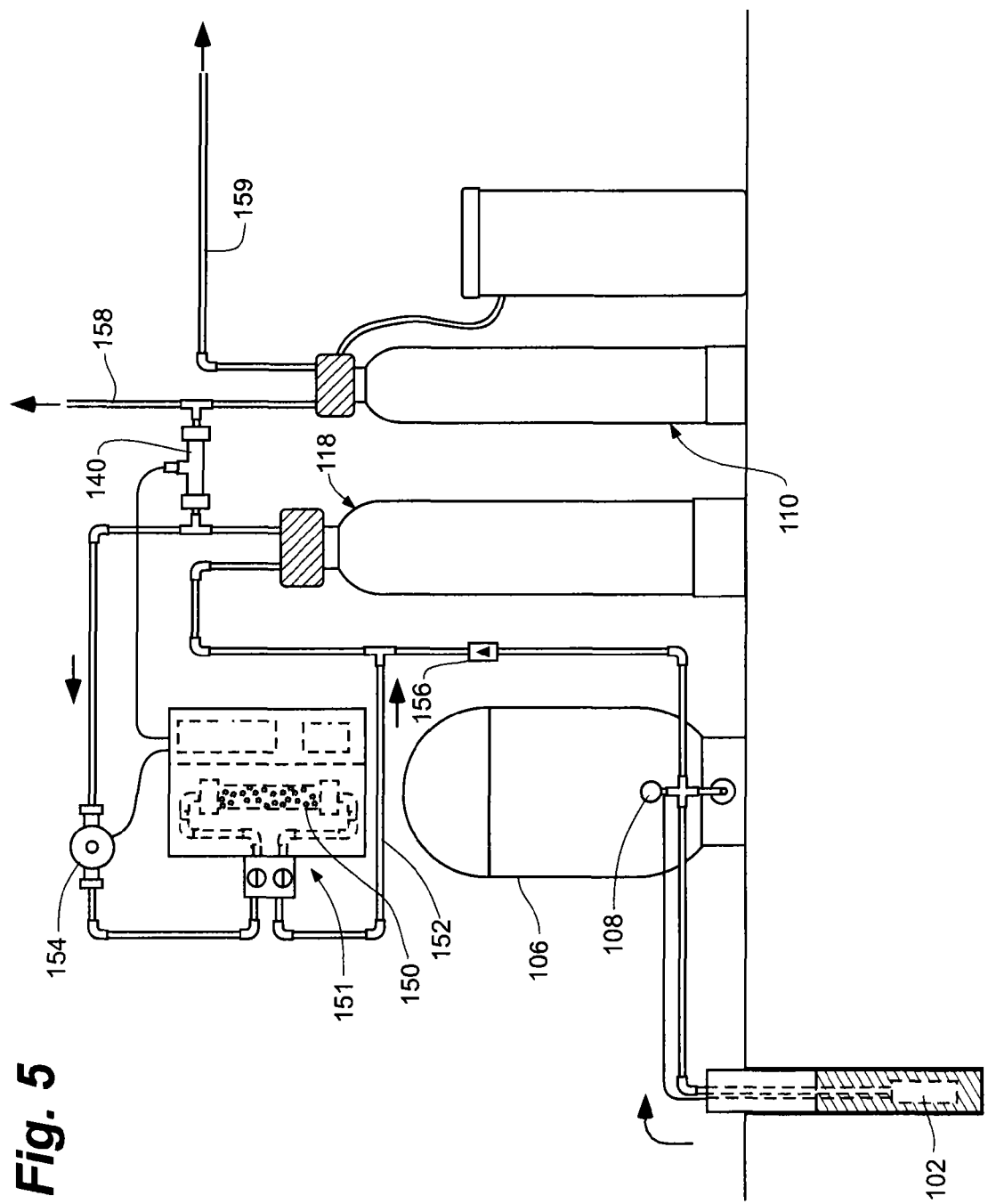
FIG. 5 is a schematic flow diagram of an embodiment of a well water system according to the present invention using clean water electrolysis for iron removal.

FIG. 5 shows an electrolytic iron-removal system which treats a portion of the entire water flow. In practice this type of flow-through arrangement is effective due to the large amounts of dissolved oxygen gas that can entrained within a bypass flow. Therefore, the electrolytic chamber 150 need not be exposed to the entire flow stream in order to effectively oxidize contaminant within the water. Given this development, the electrolytic chamber 150 can be arranged in bypass flow. By altering the pressure-drop, a bypass flow 152 can be returned back upstream. A pump 154 is shown in this arrangement providing the necessary additional pressure to force the bypass flow 152 into the water coming out of the pressure tank 106.

Water which has been treated and cleaned by filtration in the sand filter 118 is obtained using the pump 154 to direct water through a connection into the electrolytic oxygen generator 151. At this point, metallic-free water is oxidized and returned to the main flow stream. This oxidized bypass flow 152 is injected before the sand filter 118 and is therefore blended with the raw un-treated water. The oxygen saturated bypass water has sufficient ability to react with any aqueous metal in the raw water coming from the pressure tank 106. The metals are oxidized, precipitated, and then filtered from the water. In this environment, the electrolytic chamber 150 can operate for extended times before any significant metallic fouling occurs. A check valve 156 can be installed into the raw water line coming from the pressure tank 106 to prevent any oxidized water from affecting upstream components such as the pressure tank 106, pressure switch 108, or well pump 102. It may be desirable for some water systems to have a hard water tap 158 which provides hard water for irrigation and a separate soft water tap 159 for laundry and other household uses. In this case, it is preferable for any device such as the flow sensor 140 to be installed at a point after the sand filter 118, but before any hard water tap 158 is located to be able to measure any water that is flowing regardless of whether it is hard or soft water.

Figure 6:
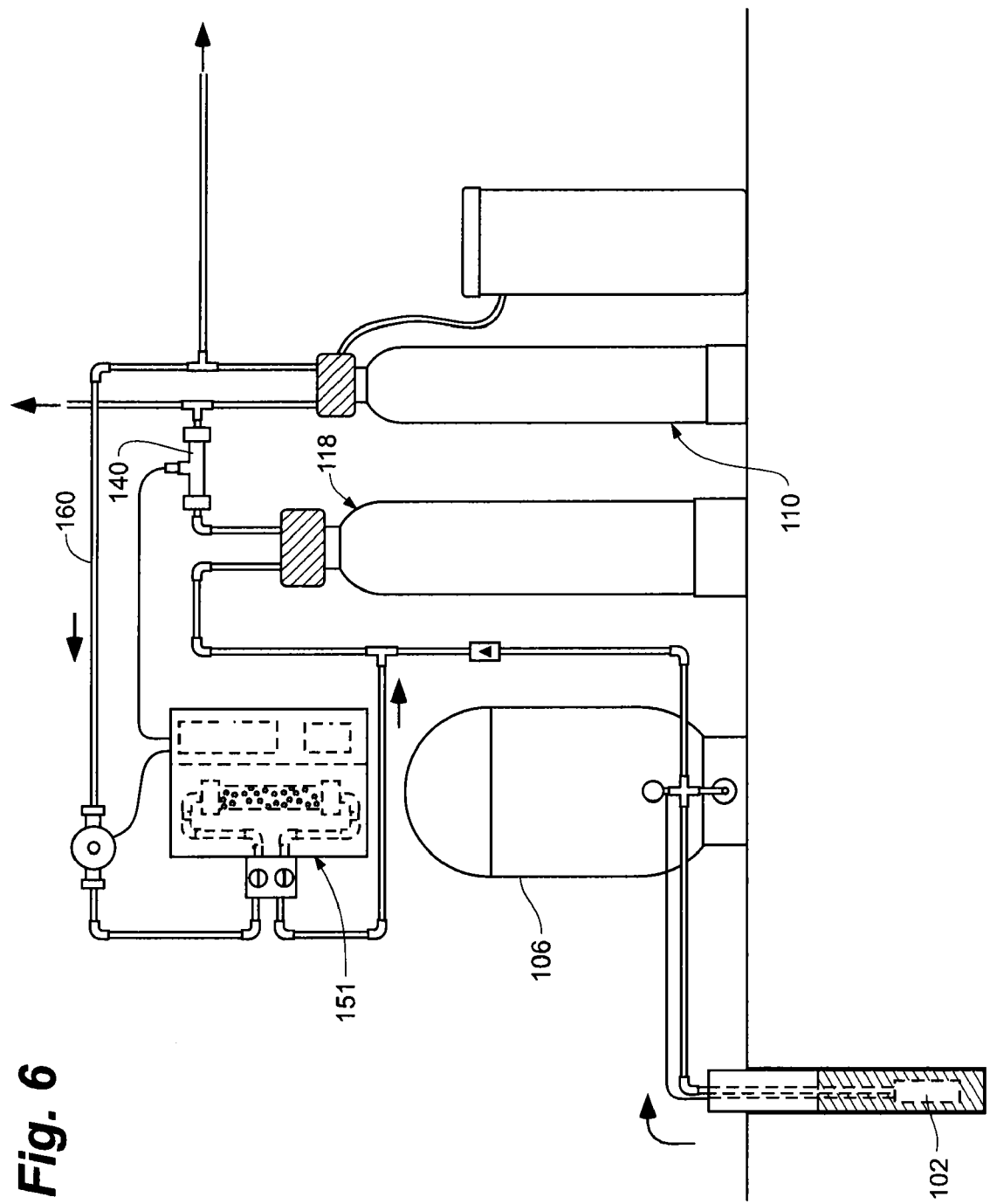
FIG. 6 is a schematic flow diagram of an embodiment of a well water system according to the present invention using clean water electrolysis with soft water chlorine generation.

FIG. 6 differs from FIG. 5 by showing the bypass flow 160 being drawn into the electrolytic oxygen generator 151 after the water is softened in the water softener 110. It can be beneficial to eliminate the possibility of hard water deposits and scale by using softened water in the electrolytic oxygen generator 151. The minerals in soft water are easily re-dissolvable and will not precipitate as permanently as hard water minerals. This arrangement further reduces the possibility of fouling the electrodes in the electrolytic oxygen generator 151.

Softened water is water which has had its "hard" minerals exchanged for "soft" minerals and the most common type of soft mineral is sodium chloride. During electrolysis, sodium chloride will evolve chlorine and this will form sodium hypochlorite (bleach). This is the same chemical disinfectant which the municipalities use to treat city water and swimming pools. Many residential well water systems are plagued with organic contaminants and other toxic pathogens. Chlorine is metered into these wells using venturi injectors, metering pumps, or even electrolytic chlorinators. Swimming pools also benefit from electrolytic chlorinators when sufficient amounts of common table salt (sodium chloride) are added to the water.

FIG. 6 shows that by introducing softened water containing sodium chloride into an electrolytic oxygen generator 151 the system can be arranged to produce chlorine. This disinfectant can help to or completely eliminate iron bacteria and other organic contaminants by keeping the large surface area (breeding grounds) of the sand filter 118 and water softener 110, and the entire plumbing system disinfected. Various catalytic coatings can be beneficial to enhance the formation of oxygen such as iridium, or chlorine such as ruthenium. Variations and blends can be optimized for either or both functions.

Electrolytic oxygen generators 151 can only work if the water has a sufficient amount of minerals ionically dissolved into the water. Operating one of these electrolytic oxygen generators 151 in pure water will not work because no electricity will flow through the water as pure water conducts no electricity. Electrical current must jump from ion to ion to travel between the electrodes and complete a circuit. It is important that there is at least a minimum amount of minerals for the electrochemistry to work correctly. It should be noted that too much mineral concentration will also adversely affect the performance and or life of the electrodes. If there are high levels of sodium chloride in the water, the levels of chlorine generated may be too high for normal water use.

Figure 7:
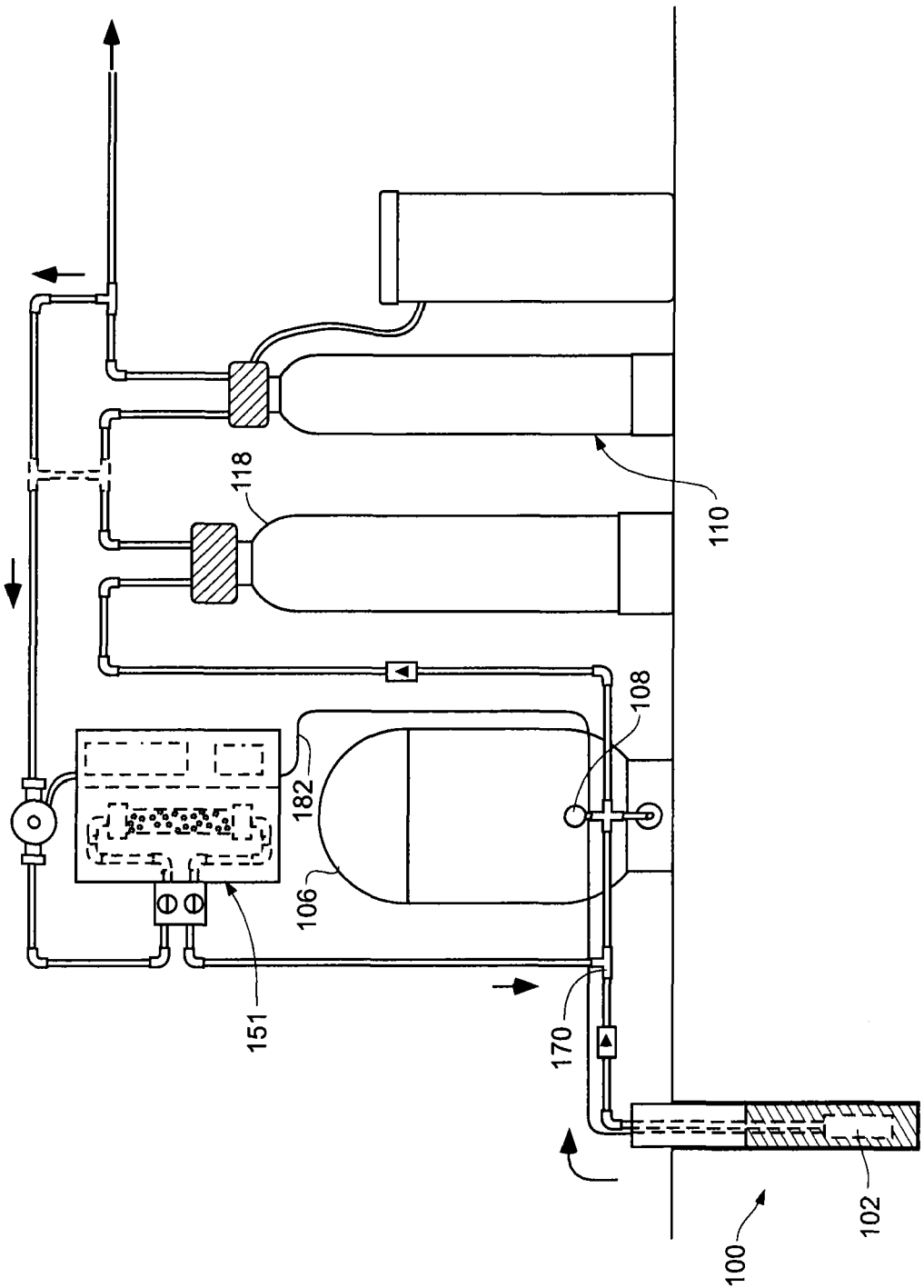
FIG. 7 is a schematic flow diagram of an embodiment of a well water system according to the present invention using clean water electrolysis injecting into pressure tank with pump.

FIG. 7 depicts the same general arrangement as in FIGS. 5 and 6, but the bypass injection point 170 is before the pressure tank 106. A typical well pump 102 charges the pressure tank 106 until its pressure reaches a set point. Sixty pounds per square inch (psi) is a typical high set point. When the pressure tank 106 empties, the pressure drops until the pressure switch senses its low set-point which could be set to forty psi. The pressure switch 108 at the pressure tank 106 turns the pump 102 on and off. The electrolytic oxygen generator 151 can be similarly turned on and off by a connection 182 to the pressure switch 108 such that the electrolytic oxygen generator 151 is in operation only when the well pump 102 is operating. In this way, all of the water that is drawn from the well 100 is oxidized and stored inside the pressure tank 106. When any water is used in a residence, even if only drop by drop, it is all filtered by the sand filter 118 and no well water 104 escapes the oxidizing process. In this arrangement—no untreated raw well water 104 can ever contaminate the downstream piping.

One of the disadvantages with the systems as depicted in FIGS. 5 and 6 is that water usage rates which are slower than the flow sensor 140 minimum threshold (which can be as high as three-quarters of a gallon per minute) will go undetected and therefore not treated. It is possible that the entire water system can become contaminated with metals if the flow rates are less than the flow sensor 140 threshold set-point. Additionally, constant-pressure well pumps 102 which are triggered to operate at small pressure drops and at variable speeds, which keep the system pressure and flow rates nearly constant, will require a separate flow sensor. In systems with high levels of aqueous metals, precipitated oxides can form at a fast rate which will settle at the bottom of the pressure tank 106 and may eventually plug the system. A self flushing pressure tank can help to reduce this problem build-up.

It can be seen that the bypass water can be drawn from either locations after the sand filter 118 or after the softener 110 depending on the desire to evolve chlorine or manage hard water build-up on electrodes in the electrolytic oxygen generator 151.

Figure 8:
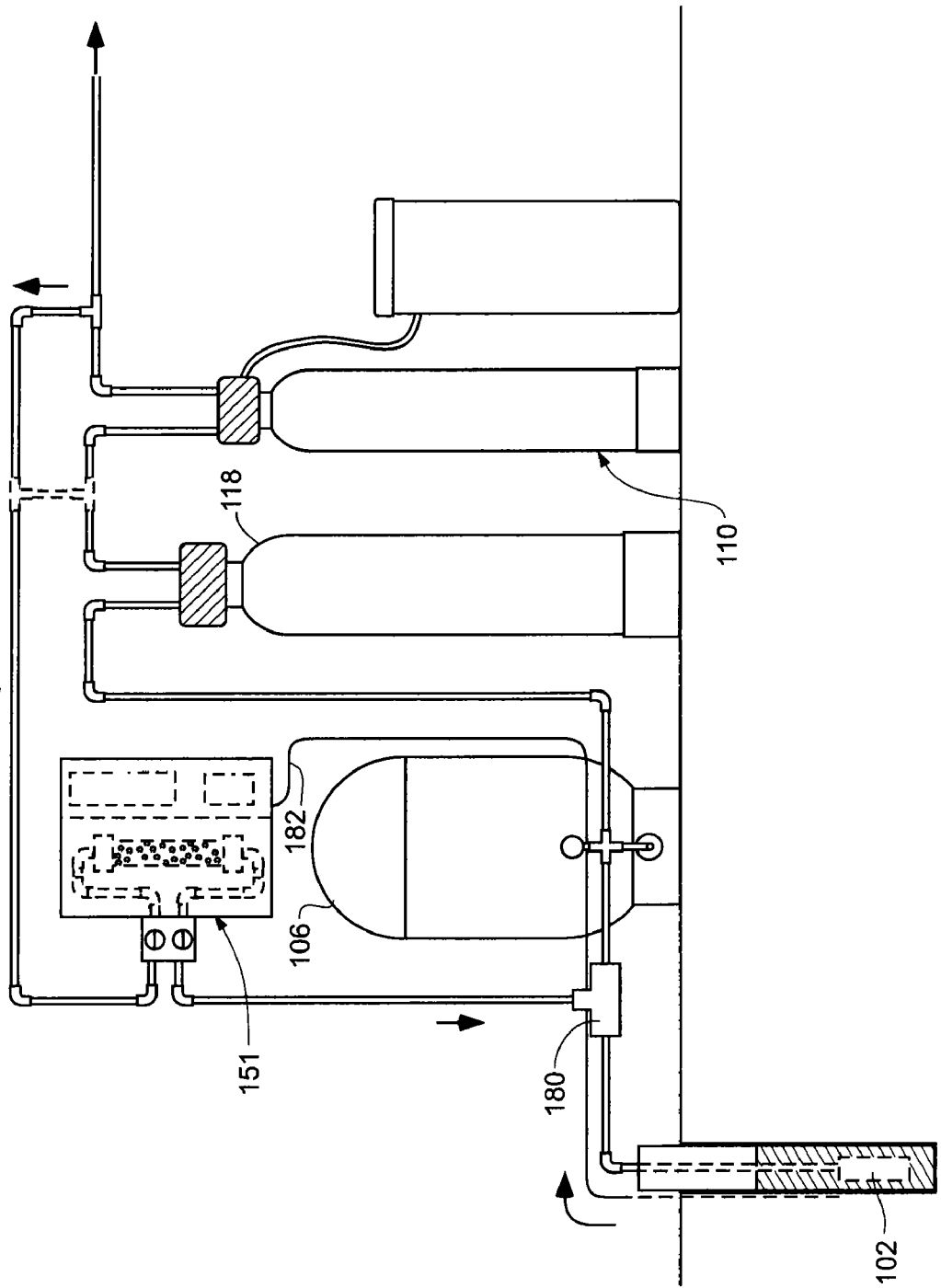
FIG. 8 is a schematic flow diagram of an embodiment of a well water system according to the present invention using clean water electrolysis injecting into pressure tank with a venturi.

FIG. 8 shows a system which does not require a pump to cause water to flow upstream through the electrolytic oxygen generator 151. In this arrangement, a venturi 180 is positioned between the well pump 102 and the pressure tank 106 to generate a low pressure intake while the well pump 102 is charging the pressure tank 106. The venturi 180 can be tuned to draw oxidized water from the electrolytic oxygen generator 151 when the pressure in the tank 106 is at a given pressure by providing an adjustment mechanism, such as a screw, to change the flow conditions internal to the venturi 180. The venturi 180 can be tuned to only operate for part of the entire pressure tank 106 charge cycle. The electrolytic oxygen generator 151 can be signaled when to turn on and off by sensing when the pressure tank 106 is in its fill cycle through a connection 182 to the pressure switch 108 associated with the pressure tank 106.

This arrangement is perhaps the simplest clean-water electrolytic oxygen generator system considering it does not require a bypass pump or an additional flow sensor. It can be seen that the water can be drawn from after the sand filter 118 or after the water softener 110 depending on the desire to evolve chlorine or manage hard water build-up on electrodes in the electrolytic oxygen generator 151.

Figure 9:
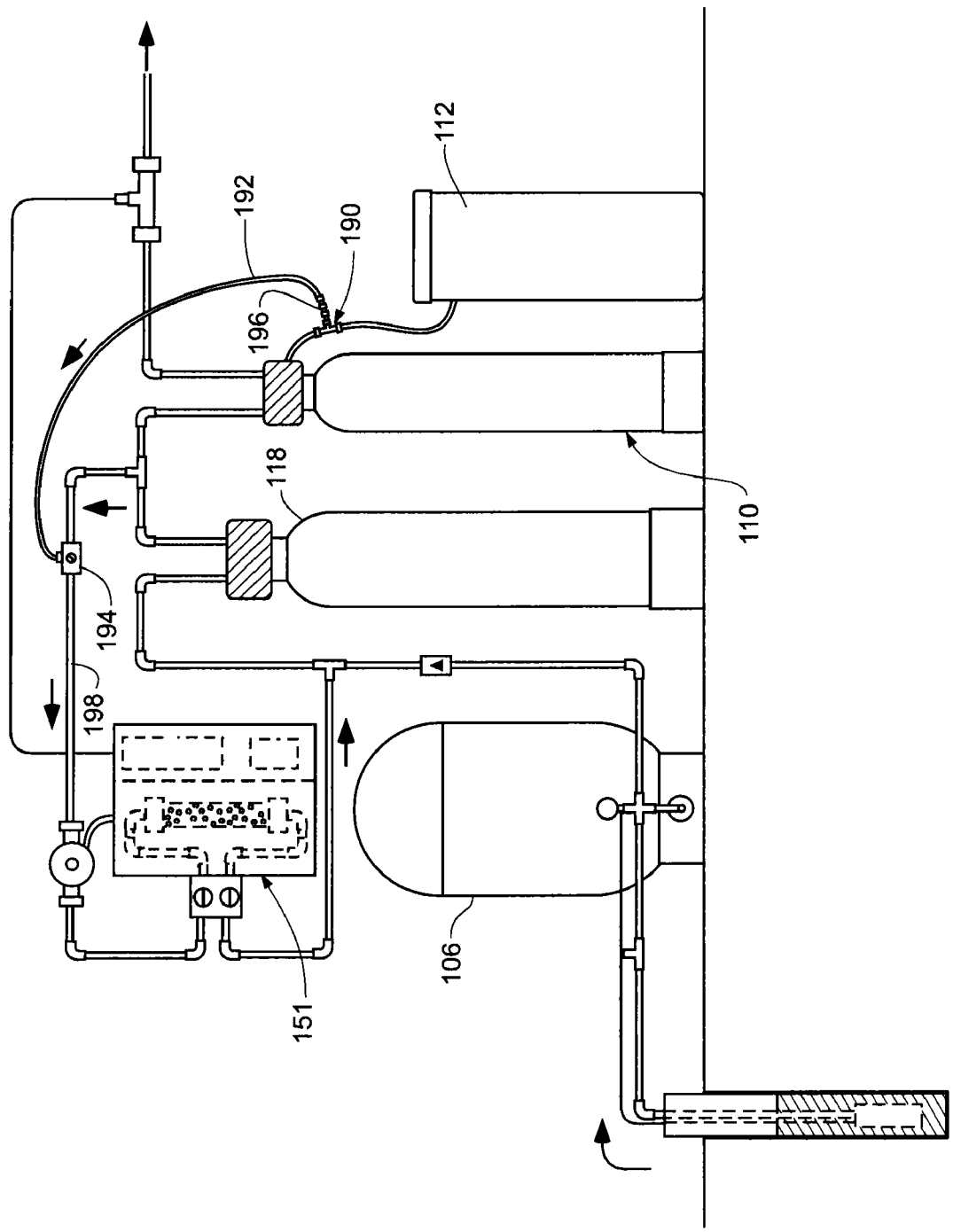
FIG. 9 is a schematic flow diagram of an embodiment of a well water system according to the present invention using clean water electrolysis and brine tank chlorine generation.

FIG. 9 shows a means to produce higher levels of chlorine for shocking the entire water system. By attaching a tap 190 to the brine tank 112 of a water softener 110, water saturated with sodium chloride can be drawn into the electrolytic oxygen generator 151. If this line 192 is controlled by a suitable valve 196, the system can be operated on a "shock" mode. A water system can operate this way to soak overnight to "pickle" the system periodically or on a as needed basis. After closing the brine valve 196 and flushing the pipes, the water systems is refreshed, cleaned, and disinfected as desired. A venturi 194 can also be used to draw the brine from the brine tank 112 into the bypass stream 198.

Figure 10:
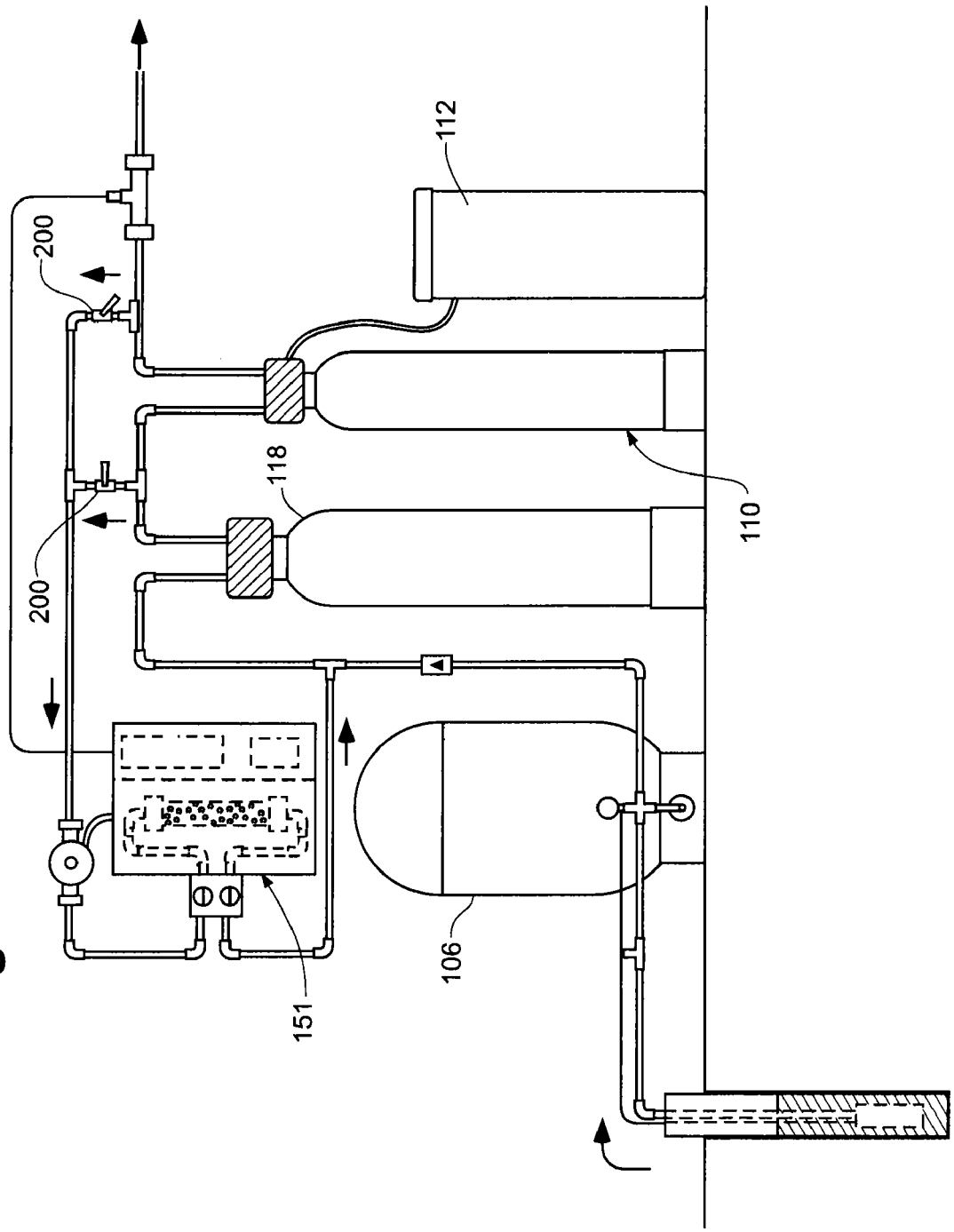
FIG. 10 is a schematic flow diagram of an embodiment of a well water system according to the present invention using clean water electrolysis with blending valves.

FIG. 10 shows a variation wherein bypass water can be selected or blended by the use of blending valves 200 from after the sand filter 118 and after the water softener 110. In this arrangement, each installation can be customized for the optimal blend of softened water and oxygenate hard water introduced into the electrolytic oxygen generator 151 to produce a desired amount of oxygen, oxygen species, chlorine and other gases for disinfection or even shock disinfection in the system.

Figure 11:
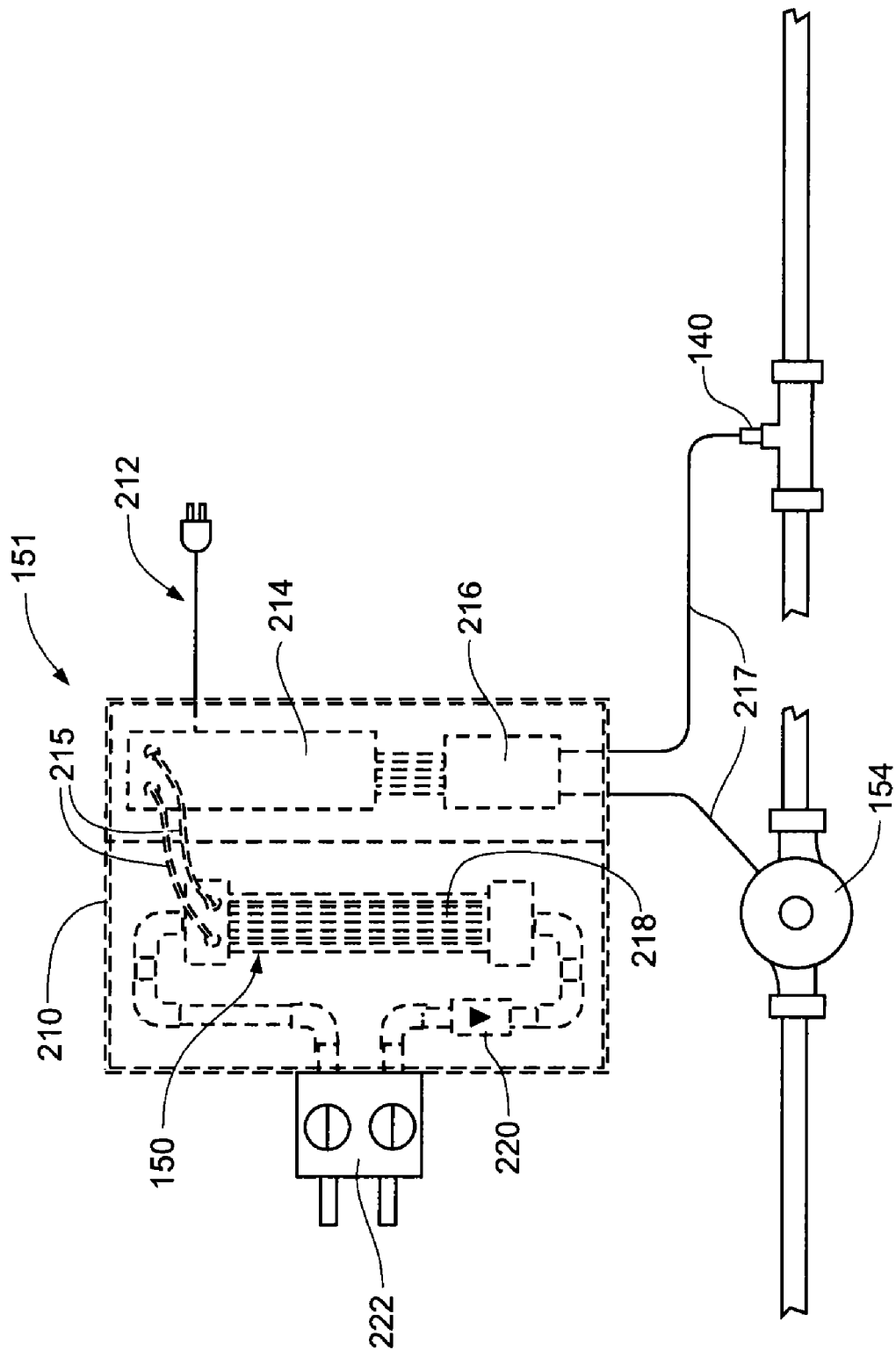
FIG. 11 is a partially hidden, schematic diagram of an embodiment of a compartmentalized electrolytic oxygen generator according to the present invention.

FIG. 11 shows the detail of an electrolytic oxygen generator 151. The majority of the components can reside inside a main enclosure 210 for convenience. The necessary components include a source of electrical power 212 which can be household alternating current. A power transformer or similar power supply 214 that creates direct current at a voltage ranging from a single volt as high as twenty-four volts. A controller 216 is used to determine when to operate, and how and when to reverse the electrode polarity to keep the electrodes 218 clean. Also, the controller 216 can communicate with any flow sensor 140 or control a bypass pump 154 through appropriate connections 217. In some cases, it is desirable to provide a check valve 220 to prevent back flow or limit the backwards migration of oxygenated water. The electrolytic chamber 150 is connected with electrical conductors 215 to the power supply 214 and is plumbed to receive and output the flow of water. A bypass valve 222 can be used to disconnect the entire electrolytic oxygen generator 151 system from the surrounding plumbing for maintenance. A suitable flow sensor 140 is preferably used to determine when water is flowing so that the electrolytic chamber 150 can be energized only at the appropriate time.

Figure 12:
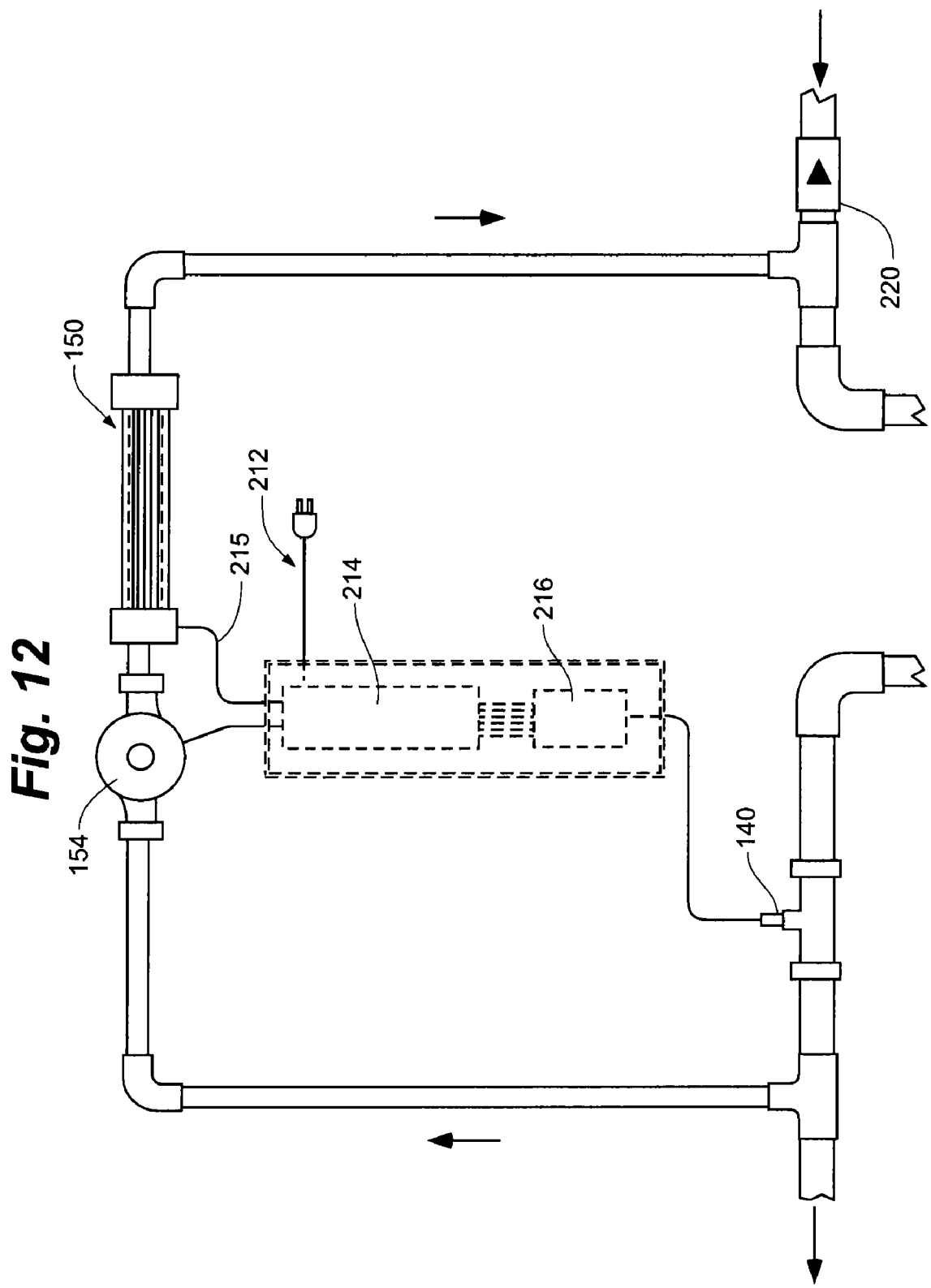
FIG. 12 is a partially hidden, schematic diagram of an embodiment of a distributed electrolytic oxygen generator according to the present invention.

FIG. 12 is similar to FIG. 11 except that all the components do not need to be arranged inside a main enclosure 210 but they can be distributed in different locations to facilitate economics, parallel or series systems, space constraints, maintenance requirements, etc.

Figure 13:
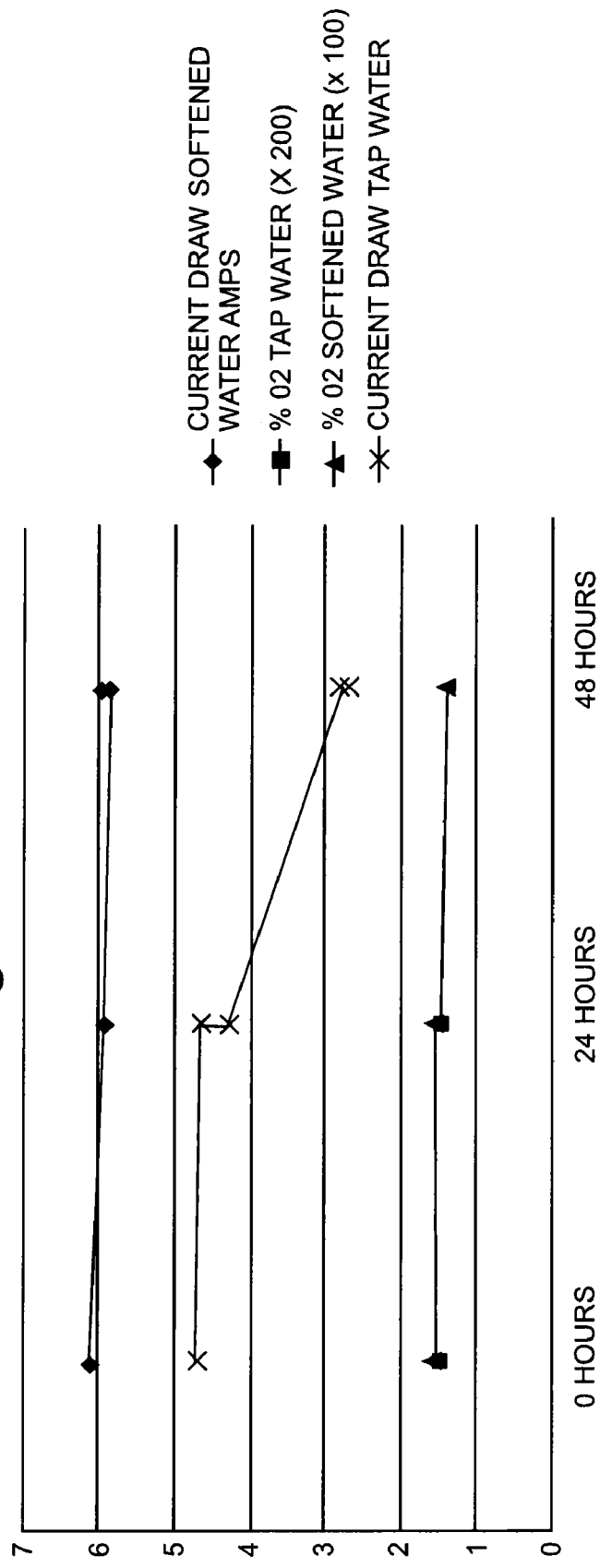
FIG. 13 is a graph illustrating side-by-side comparison testing of electrolytic elements operating within softened and non-softened water sources respectively.

Referring now to Table A below as well as FIG. 13, testing was conducted to verify the performance improvements of the present invention. A test apparatus was created in which performance characteristics of side-by-side electrolytic elements were measured over the course of 48 hours of continuous use. Based on an assumed residential usage of 3 hours per day, the testing simulated expected performance over a 16 day period. One of the electrolytic elements was supplied with municipally supplied tap water while the second electrolytic element was supplied with a softened version of the municipal tap water. As depicted in FIG. 13, the current draw for the electrolytic element exposed to the municipal tap water experienced a significant drop in current draw as compared to the electrolytic element running on the softened municipal water. This drop in current drawn is directly attributable to the formation of scale on the electrolytic element, calcium and magnesium scale specifically. Based on the trending illustrated in FIG. 13, it is understood that the electrolytic element operating in the non-softened environment will require polarity reversals of the electrolytic element at shorter intervals in order to draw enough current to successfully generate sufficient gaseous oxygen. While the % of oxygen gas in the electrolyzed water is essentially constant for both the softened and non-softened water sources, this is primarily due to the oxygen saturation limits of water and the efficiency of the electrolytic generator. As the current draw continues to decrease, ultimately the amount of oxygen gas generated will drop below the saturation limits and the percentage of oxygen present within the electrolyzed water will drop.

TABLE A

Comparison Testing of Electrolytic Elements In Softened and Non-Softened Water

|  | Time (hours) 0.0 (Start) | Time (hours) 1.0 | Time (hours) 23.0 | Time (hours) 25.0 | Time (hours) 44.0 | Time (hours) 48.0 (Final) |
| --- | --- | --- | --- | --- | --- | --- |
| Softened O2% | 154.6 | 148.3 | 141.1 | 143.8 | 143.4 | 147 |
| Non-Softened O2% | 160 | 154.7 | 140.8 | 141.5 | 143.1 | 139.4 |
| Softened Current Draw (amps) | 6.10 | 6.10 | 5.93 | 5093 | 5.86 | 6.00 |
| Non-Softened Current Draw (amps) | 4.66 | 4.73 | 4.63 | 4.30 | 2.87 | 2.83 |

Figure 14:
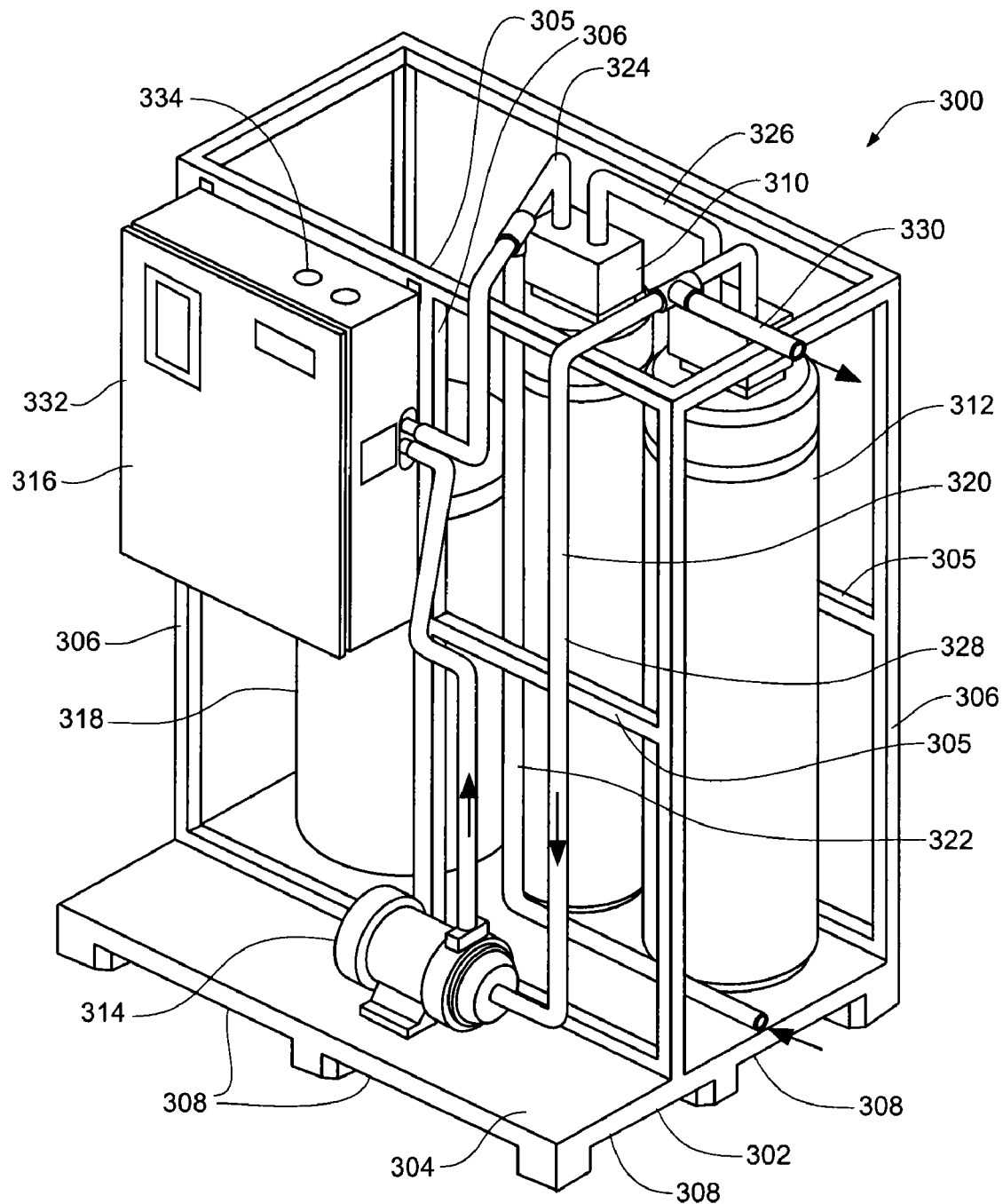
FIG. 14 is a top, perspective view of a pre-packaged filtration system according to an embodiment of the present invention.
Figure 15:
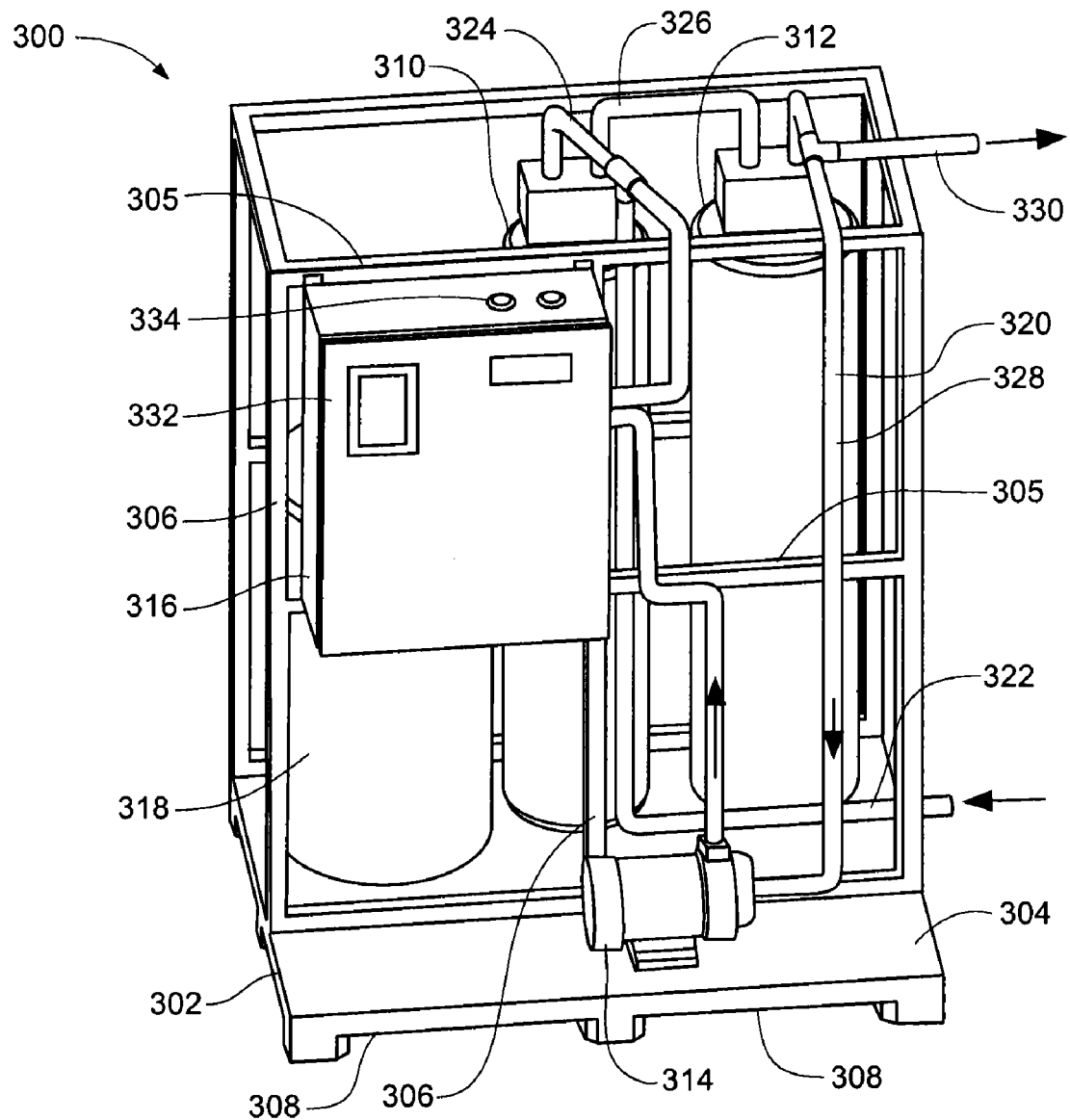
FIG. 15 is a top, perspective view of the pre-packaged filtration system of FIG. 14.

Referring now to FIGS. 14 and 15, a pre-packaged filtration system 300 is illustrated providing for ease of use and installation. Generally, pre-packaged filtration system 300 comprises a skid for frame based system having a mounting frame 302 including a mounting floor 304, a plurality of horizontal mounting members 305 and a plurality of vertical mounting members 306. Mounting floor 304 generally defines a plurality of access points 308 allowing the pre-packaged filtration system 300 to be lifted and positioned as an integral system with a suitable lifting device such as, for example, a pallet jack, fork lift and the like. Mounting frame 302 is preferably constructed of metallic members such as, for example, metal tubing or channel. For corrosion resistance purposes, mounting frame 302 can include a suitable paint finish or be fabricated or corrosion resistant materials such as stainless steel or aluminum.

Pre-packaged filtration system 300 further comprises a media filter 310, a water softener 312, a bypass pump 314 and an electrolytic generator 316, all of which are fixably retained to the mounting frame 302 by suitable connection to the mounting floor 304 and mounting members 306. Depending upon desired system capacity and dimensional limitations, water softener 312 can include an integral brine tank or alternative, a stand-alone brine tank 318 that is similarly mounted to the mounting frame 302. In some embodiments, a saturated sodium chloride stream from the brine tank 318 can be selectively treated with the electrolytic generator 316 to generate chlorine gas for purposes of disinfecting, sanitizing or otherwise shocking the pre-packaged filtration system 300.

Pre-packaged filtration system 300 further comprises an integrated plumbing network 320 for fluidly interconnecting the various components. As illustrated, integrated plumbing network 320 includes a raw water inlet portion 322, on oxygenated raw water portion 324, a media filtered raw water portion 326, a softened bypass portion 328 and a softened outlet portion 330. Integrated plumbing network 320 is generally formed of suitable materials such as, for example, PVC or CPVC piping or polyethylene hose. Bypass pump 314 and an electrolytic element of the electrolytic generator 316 are fluidly positioned in the softened bypass portion 328. It will be understood that pre-packaged filtration system 300 and integrated plumbing network 320 can assume the variety of system configurations illustrated and as discussed previously with respect to FIGS. 5-10.

Pre-packaged filtration system 300 allows for easy of use and installation by providing an essentially self-contained filtration system for removing contaminants including, for example, aqueous metals, from a water supply. Generally, pre-packaged filtration system 300 can be positioned at a desired point of use and connected by attaching the raw water inlet portion 322 to a water supply and the softened outlet portion 330 to a water distribution plumbing network. The media filter 310, water softener 312, bypass pump 314 are preferably wired to an electrical box 332 on the electrolytic generator 316 such that the pre-packaged filtration system 300 shares a common power inlet 334 on the electrolytic generator 316. A raw water supply inters the raw water inlet portion 322 and is through the media filter 310 wherein any particulate matter including oxidized metal precipitates is removed. The filtered water enters the water softener 312 through the media filtered raw water portion 326 such that any hardness within the water is removed. The softened water leaves the water softener 312 and is distributed to points of use through the softened outlet portion 330. A portion of the softened water is recirculated through the softened bypass portion 328 using bypass pump 314. This softened water flows past the inline electrolytic element such that oxygen gas is generated and dissolved within the recirculated softened water. The recirculated softened water including the dissolved oxygen gas is directed into the raw water inlet portion 322 such that any contaminants including aqueous metals are oxidized or otherwise treated prior to the media filter 310 for removal by the media filter 310. By eliminating the exposure of the inline electrolytic element to harness, scaling on the inline electrolytic element is reduced if not eliminated.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The invention claimed is:

1. A residential water treatment system for treating a well water source, comprising:
   a water softener removing hardness from a raw water supply to form a softened water stream;
   a bypass line for recirculating a bypass stream including at least a portion of the softened water stream to a location between the well pump and the water softener;
   an electrolytic generator having a flow-through electrolytic element including both a cathode and an electrode mounted directly within the bypass stream, wherein a hardness level of the bypass stream is reduced in comparison to the raw water supply to limit scale formation of the flow-through electrolytic element; and
   a brine supply line from a brine tank of the water softener, the brine supply line fluidly connected to the bypass line for directing a saturated sodium chloride stream through the flow-through electrolytic element to form an oxygenated and chlorinated water stream.

2. The residential water treatment system of claim 1, further comprising:
   a media filter fluidly located between the well pump and the water softener, the media filter removing insoluble metal precipitates formed by oxidation of aqueous metals present in the raw water supply.

3. The residential water treatment system of claim 1, further comprising:
   a booster pump operably positioned within the bypass line, the booster pump drawing the portion of the softened water stream into the bypass line and directing the bypass stream past the electrolytic element.

4. The residential water treatment system of claim 1, further comprising:
   a pressure tank for receiving the raw water supply from a well pump and an oxygenated water stream from the bypass line, the pressure tank having a pressure switch selectively controlling operation of the well pump and the electrolytic generator based upon measurements of a low pressure condition and a high pressure condition within the pressure tank.

5. The residential water treatment system of claim 4, wherein the pressure tank includes a self-flush system for removing insoluble metal precipitates introduced by oxidation of aqueous metals within the raw water supply.

6. The residential water treatment system of claim 1, further comprising a check valve fluidly mounted between the water softener and a well pump to prevent an oxygenated water stream from entering the well pump.

7. A pre-packaged electrolytic water treatment system having reduced scale loading, comprising:
   a mounting frame;
   a water softener;
   a media filter;
   a bypass pump;
   an electrolytic generator including a flow-through electrolytic element; and
   a plumbing network including a raw water inlet portion, an oxygenated raw water portion; a media filterer raw water portion; a softened bypass portion and a softened outlet portion, the plumbing network further including a softener brine portion fluidly coupled to the softened bypass portion such that a saturated sodium chloride stream can be selectively directed through the flow-through electrolytic element to form a chlorinated water stream,
   wherein the flow-through electrolytic generator and the bypass pump are fluidly mounted within the softened bypass portion such that the flow-through electrolytic generator operates within a reduced hardness bypass flow stream in comparison to a raw water inlet stream so as to limit scale formation on the flow-through electrolytic element.

8. The pre-packaged electrolytic water treatment system of claim 7, wherein the electrolytic generator includes a power connection such that the water softener, media filter, bypass pump and electrolytic generator are all electrically powered from the power connection.

9. The pre-packaged electrolytic water treatment system of 7, wherein the plumbing network and the electrolytic generator are operably mounted on the mounting frame with a plurality of vertical and horizontal mounting members.

10. The pre-packaged electrolytic water treatment system of 7, wherein the mounting frame includes a mounting floor having a plurality of access points for accommodating a lifting device such that the pre-packaged electrolytic water treatment system is adapted for positioning as an integral unit.

* * * * *